(12) United States Patent
Yu et al.

(10) Patent No.: US 12,354,064 B2
(45) Date of Patent: Jul. 8, 2025

(54) METHOD AND APPARATUS FOR SHARING DATA ACROSS GROUPS

(71) Applicant: Alibaba Group Holding Limited, Grand Cayman (KY)

(72) Inventors: Peng Yu, Hangzhou (CN); Yang Ding, Hangzhou (CN); Zhigao Yao, Hangzhou (CN); Yidong Fang, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 277 days.

(21) Appl. No.: 16/766,819

(22) PCT Filed: Dec. 10, 2018

(86) PCT No.: PCT/CN2018/120078
§ 371 (c)(1),
(2) Date: May 26, 2020

(87) PCT Pub. No.: WO2019/114654
PCT Pub. Date: Jun. 20, 2019

(65) Prior Publication Data
US 2021/0019705 A1 Jan. 21, 2021

(30) Foreign Application Priority Data
Dec. 15, 2017 (CN) .......................... 201711353985.6

(51) Int. Cl.
*G06Q 10/10* (2023.01)
*G06F 16/27* (2019.01)

(52) U.S. Cl.
CPC .......... *G06Q 10/103* (2013.01); *G06F 16/27* (2019.01)

(58) Field of Classification Search
None
See application file for complete search history.

(56) References Cited

U.S. PATENT DOCUMENTS 8,024,661 B2 9/2011 Bibliowicz et al.
8,073,811 B2 12/2011 Strathearn et al.
(Continued)

FOREIGN PATENT DOCUMENTS

CN 105335843 A 2/2016
CN 106372861 A 2/2017
(Continued)

OTHER PUBLICATIONS

Supplemental European Search Report to corresponding EP Application No. 18888467.0 mailed Aug. 4, 2021 (11 pages).
(Continued)

*Primary Examiner* — Jan P Mincarelli
(74) *Attorney, Agent, or Firm* — James J. DeCarlo; Greenberg Traurig, LLP

(57) ABSTRACT

Embodiments of the disclosure provide a method and an apparatus for sharing data across groups. In one embodiment, the method comprises creating, by a cross-group collaboration platform, a collaboration project; determining, by the cross-group collaboration platform, groups participating in the collaboration project to designate the groups as project collaborators for the collaboration project; and sharing, by the cross-group collaboration platform, collaboration data amongst the project collaborators of the collaboration project.

15 Claims, 19 Drawing Sheets

(56) References Cited

U.S. PATENT DOCUMENTS

| | | |
|---|---|---|
| 8,176,189 B2 | 5/2012 | Traversat et al. |
| 8,543,916 B2 | 9/2013 | Anderson et al. |
| 9,594,825 B2 | 3/2017 | Skarin et al. |
| 9,652,225 B1 | 5/2017 | Bohn et al. |
| 9,715,476 B2 | 7/2017 | Megiddo et al. |
| 9,817,805 B1 | 11/2017 | Markman et al. |
| 9,836,490 B2 | 12/2017 | Greenbert et al. |
| 9,935,960 B2 | 4/2018 | Raizada |
| 10,235,022 B2 | 3/2019 | Eccleston et al. |
| 10,467,677 B2 | 11/2019 | Wilson et al. |
| 10,621,203 B2 | 4/2020 | Hunt et al. |
| 2003/0023677 A1* | 1/2003 | Morison Zuill ....... G06Q 10/10 709/206 |
| 2007/0283278 A1* | 12/2007 | Hupfer ................ H04L 65/4015 715/751 |
| 2014/0258275 A1 | 9/2014 | Paritosh |
| 2014/0282077 A1 | 9/2014 | Wilson et al. |
| 2015/0081624 A1* | 3/2015 | Masse ................. G06Q 10/103 707/608 |
| 2015/0227514 A1 | 8/2015 | Gillett et al. |
| 2017/0329750 A1* | 11/2017 | Kazama ................. G06Q 10/10 |
| 2018/0032956 A1* | 2/2018 | Choi ........................ H04L 67/10 |
| 2018/0107980 A1* | 4/2018 | Savage ................ G06Q 10/101 |
| 2019/0147402 A1* | 5/2019 | Sitrick ................ H04L 12/1822 705/301 |

FOREIGN PATENT DOCUMENTS

| | | |
|---|---|---|
| CN | 106485471 A | 3/2017 |
| CN | 107169733 A | 9/2017 |

OTHER PUBLICATIONS

International Search Report to corresponding International Application No. PCT/CN2018/120078 mailed Jan. 30, 2019 (2 pages).

* cited by examiner

| External collaborative project | |
|---|---|
| Initiate collaboration 602 / Participate in collaboration 604 | |
| Project name | Project x |
| Project description | Collaborative research and development for new products meeting user requirements ... |
| Shared content | ☑ Basic information of project<br>☑ Project member information<br>☑ Data and configuration related to work project |
| First party information | |
| Project leader | Xiaobai ⊗ |
| Project member | Baibai ⊗ Xiaohei ⊗ |
| Collaborator information | |
| Collaborator enterprise | Enterprise BB ⊗ Enterprise CC ⊗ |
| | Submit Application    Cancel |

| | Application for initiating external collaborative project | | | |
|---|---|---|---|---|
| Approval process | | | | |
| Process steps | Handler | Approval result | Handling time | Approval comments |
| Submit application | Xiaobai | — | 2017-06-27 18:25 | — |
| Review by director | Liang | Approved | 2017-06-27 18:40 | Agreed |
| Review by second level director | Yezi | Approved | 2017-06-27 19:01 | OK |
| Invitation code generation | Automatically handled by system | — | 2017-06-27 19:01 | Invitation code: b11fce |

Content for approval

Project name: project X
Project description: collaborative research and development for new products meeting user requirements ...
Shared content: basic information of project; project member information; data and configuration related to work project
Project leader: Xiaobai
Project member: Baibai; Xiaohei
Collaborator enterprise: enterprise BB; enterprise CC

| | Application for participating in external collaborative project | | | | |
|---|---|---|---|---|---|
| Approval process | | | | | |
| Process steps | Handler | Approval result | Handling time | Approval comments | |
| Submit application | Xiaomei | —— | 2017-06-27 19:30 | —— | |
| Review by director | Liangge | Approved | 2017-06-27 19:32 | Agreed | |
| Review by second level director | Xiaofei | Approved | 2017-06-27 20:05 | OK | |
| Content for approval | | | | | |
| Project name: project X | | | | | |
| Project description: collaborative research and development for new products meeting user requirements ... | | | | | |
| Shared content: basic information of project; project member information; data and configuration related to work project | | | | | 1000 |
| Project leader: Xiaomei | | | | | |
| Project member: Laowang; Huang | | | | | |
| Collaborator enterprise: enterprise AA | | | | | |

FIG. 10

Application for trusted collaborator

Approval process

| Process steps | Handler | Approval result | Handling time | Approval comments |
|---|---|---|---|---|
| Submit application | Xiaomei | — | 2017-06-27 19:28 | — |
| Review by director | Liangge | Approved | 2017-06-27 19:35 | Agreed |
| Review by second level director | Xiaofei | Approved | 2017-06-27 20:08 | Agreed |

Content for approval

Operation purpose: add to list of trusted collaborators
Collaborator name: Enterprise AA Upon addition to the list of trusted collaborators, collaboration can be quickly initiated without the need for approval

FIG. 11

METHOD AND APPARATUS FOR SHARING DATA ACROSS GROUPS

The present application is a national stage entry of Int'l Appl. No. PCT/CN2018/120078, filed on Dec. 10, 2018, claims priority to Chinese Patent Application No. 201711353985.6, filed on Dec. 15, 2017, both of which are incorporated herein by reference in their entirety.

BACKGROUND

Technical Field

The disclosure relates to the field of terminal device technologies, and in particular, to methods and apparatuses for sharing data across groups.

Description of the Related Art

In scenarios where collaborations between a plurality of groups are involved, group members of the plurality of groups collaborate to complete the handling of tasks. During collaboration, collaboration data needs to be shared amongst the groups participating in the collaborations. Presently, data is often transmitted using of instant messaging, e-mails, and so on, which leads to not only problems of low security and control difficulty but also low sharing efficiency.

SUMMARY

Embodiments of the disclosure provide methods and apparatuses for sharing data across groups.

In one of embodiment, the disclosure provides a method for sharing data across groups, the method comprising: starting, by a first group, a collaboration approval process for a second group; and responsive to the collaboration approval process being approved, implementing a cross-group collaboration by the first group and the second group, such that collaboration data is shared between the first group and the second group during the cross-group collaboration.

In one embodiment, the disclosure provides a method for sharing data across groups, the method comprising: creating, by a cross-group collaboration platform, a collaboration project; determining, by the cross-group collaboration platform, groups participating in the collaboration project to designate the groups as project collaborators for the collaboration project; and sharing, by the cross-group collaboration platform, collaboration data amongst the project collaborators of the collaboration project.

In one embodiment, the disclosure provides a method for sharing data across, the method comprising: initiating, by a group, a collaboration request to create a collaboration project to a cross-group collaboration platform; creating a collaboration project on the cross-group collaboration platform; and sharing collaboration data by the group with at least one other group participating in the collaboration project.

In one embodiment, the disclosure provides a method for sharing data across groups, the method comprising: participating, by a group, in a collaboration project created on a cross-group collaboration platform; and sharing collaboration data by the group with at least one other group participating in the collaboration project.

In one embodiment, the disclosure provides an apparatus for sharing data across groups, the apparatus comprising: an approval unit configured to start a collaboration approval process by a first group for a second group; and a collaboration unit configured to, responsive to the collaboration approval process being approved, implement a cross-group collaboration by the first group and the second group such that collaboration data is shared between the first group and the second group during the cross-group collaboration.

In one embodiment, the disclosure provides an apparatus for sharing data across groups, the apparatus comprising: a creation unit configured to create a collaboration project by a cross-group collaboration platform; a determining unit configured to determine groups participating in the collaboration project by the cross-group collaboration platform to designate the groups as project collaborators for the collaboration project; and a sharing unit configured to share collaboration data amongst the project collaborators of the collaboration project by the cross-group collaboration platform.

In one embodiment, the disclosure provides an apparatus for sharing data across groups, the apparatus comprising: a request unit configured to initiate a request to create a collaboration project to a cross-group collaboration platform by a group to create a collaboration project on the cross-group collaboration platform; and a sharing unit configured to share collaboration data by the group with at least one other group participating in the collaboration project.

In one embodiment, the disclosure provides an apparatus for sharing data across groups, the apparatus comprising: a participation unit configured to participate, by a group, in a collaboration project created on a cross-group collaboration platform; and a sharing unit configured to share collaboration data by the group with at least one other group participating in the collaboration project.

BRIEF DESCRIPTION OF THE DRAWINGS

FIG. 6 is a diagram illustrating a project creation application interface according to some embodiments of the disclosure.

FIG. 7 is a diagram illustrating an approval interface according to some embodiments of the disclosure.

FIG. 10 is a diagram illustrating another approval interface according to some embodiments of the disclosure.

FIG. 11 is a diagram illustrating an approval interface for adding a trusted collaborator according to some embodiments of the disclosure.

DETAILED DESCRIPTION

Figure 1:
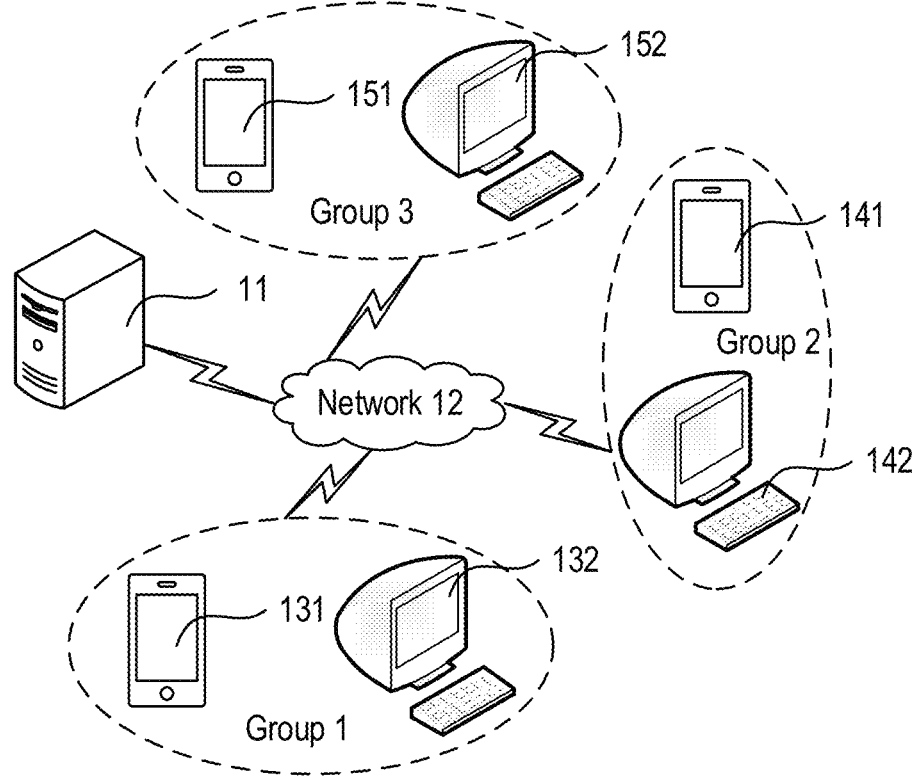
FIG. 1 is a schematic architecture diagram illustrating a cross-group collaboration system according to some embodiments of the disclosure.

Embodiments are described in detail herein, and examples thereof are shown in the drawings. When the description refers to the drawings, the same numbers in different drawings represent the same or similar elements unless otherwise indicated. The implementations described herein are exemplary and do not represent all implementations consistent with the embodiments of the disclosure. Instead, they are merely examples of apparatuses and methods described in detail and claimed herein, consistent with some aspects of the embodiments of the disclosure.

It should be noted that in other embodiments, steps of the corresponding methods are not necessarily performed in the order shown and described in the disclosure. In some other embodiments, the method can include more or fewer steps than those described in the disclosure. In addition, a single step described in the disclosure may be divided into a plurality of steps for description in other embodiments, and a plurality of steps described in the disclosure may also be combined into a single step for description in other embodiments.

FIG. 1 is a schematic architecture diagram illustrating a cross-group collaboration system according to an embodiment of the disclosure. As shown in FIG. 1, a system 100 includes a server 11, and a number of electronic devices corresponding to respective groups, connected via a network 12. In this example, a mobile phone 131 and a PC 132 are configured in group 1, a mobile phone 141, and a PC 142 are configured in group 2, and a mobile phone 151 and a PC 152 are configured in group 3.

In some embodiments, the server 11 is configured as a physical server, including an independent host. In some other embodiments, the server 11 is configured as a virtual server hosted by a cluster of hosts. During operation, the server 11 is configured to execute a server-side program corresponding to an application, implementing relevant service functionalities for the application. In one example, when the server 11 runs a program of a cross-group collaboration platform, server 11 is configured as a server of the cross-group collaboration platform.

The mobile phones 131, 141, 151, and the PCs 132, 142, 152 are exemplary types of electronic devices that can be used by members of the groups. Other types of electronic devices that can also be used include, for example, and without limitations, tablet devices, notebook computers, PDAs (Personal Digital Assistants), wearable devices (such as smart glasses or smartwatches), and the like. During operation, the electronic device is configured to execute a client-side program of an application to implement relevant service functionalities for the application. For example, when the electronic device runs a program of a cross-group collaboration platform, the electronic device is configured as a client of the cross-group collaboration platform.

In some embodiments, an application of a client of the cross-group collaboration platform is pre-installed on an electronic device so that the client can be started and run on the electronic device. In other embodiments, when an online "client" (e.g., web browser client) implemented by techniques such as HTML5, the client can be obtained and executed without the need to pre-install a corresponding application on the electronic device.

The network 12 through which the mobile phones 131, 141, and 151, as well as the PCs 132, 142, and 152 interact with the server 11 includes any types of wired or wireless networks. In one embodiment, the network 12 includes a public switched telephone network (PSTN) and the Internet.

Figure 2:
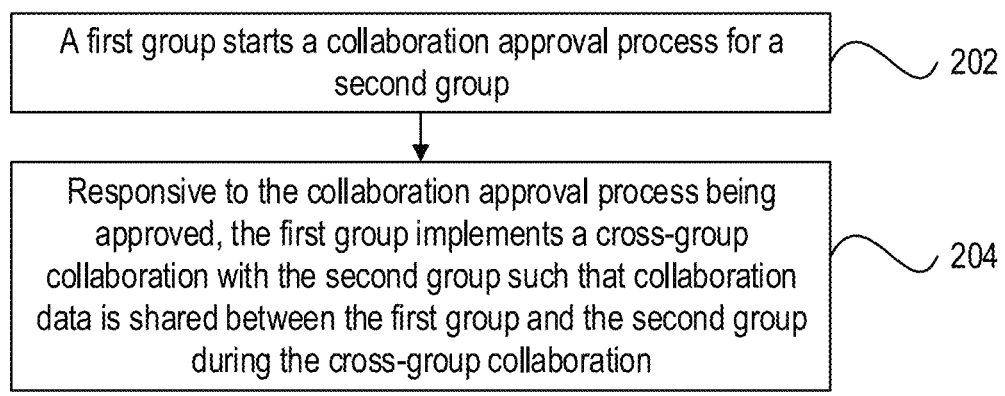
FIG. 2 is a flow diagram illustrating a method for sharing data across groups according to some embodiments of the disclosure.

FIG. 2 is a flow diagram illustrating a method for sharing data across groups based on a platform, according to an embodiment of the disclosure. As shown in FIG. 2, the method, performed on an electronic device (e.g., the mobile phones 131, 141, and 151, the PCs 132, 142 and 152 of FIG. 1), includes the following steps.

Step 202: a first group starts a collaboration approval process for a second group. According to various embodiments, the first group may include any particular group; and the second group may include one or more groups other than the first group.

In one embodiment, the first group initiates a cross-group collaboration project involving the second group. That is, the first group serves as an initiator of the collaboration project, and the second group serves as a participant of the collaboration project. Then, via the collaboration approval process for the second group, it is determined whether to allow the creation of the collaboration project. For example, when approval is obtained, the collaboration project is successfully created, such that the first group implements across-group collaboration with the second group based on the collaboration project. When approval is not obtained, the creation of the collaboration project is not allowed; thus, the cross-group collaboration is not implemented.

In some embodiments, the first group creates a collaboration project. Thus, tasks such as data management, processing control, and the like pertaining to the collaboration project are implemented at the first group; and the server of the cross-group collaboration platform functions as a data pipe between the first group and the second group. In other embodiments, the first group initiates a project creation request to the server of the cross-group collaboration platform, and the server, in turn, creates a collaboration project, as well as performs tasks such as data management, processing control, and so on, for the collaboration project.

In one embodiment, the second group initiates a cross-group collaboration project. That is, the second group serves as an initiator of the collaboration project, and the first group serves as a participant. In this case, a collaboration approval process for the second group is started to determine whether the first group is allowed to participate in the collaboration project. For example, when approval is obtained, the first group successfully participates in the collaboration project to implement the cross-group collaboration. When approval is not obtained, the first group is not allowed to participate in the collaboration project; thus, the cross-group collaboration is not be implemented.

For a collaboration project initiated by the second group, the creation process for the collaboration project is substantially similar to the embodiments above-described. In one embodiment, the second group creates a collaboration project, and the server of the cross-group collaboration platform serves as a data pipe. In other embodiments, the second group initiates a project creation request to the server of the cross-group collaboration platform, and the server, in turn, creates a collaboration project, and perform tasks such as data management, processing control, and so on, for the collaboration project.

Step 204: responsive to the collaboration approval process being approved, the first group implements a cross-group collaboration with the second group such that collaboration data is shared between the first group and the second group during the cross-group collaboration.

In one embodiment, when the first group is an initiator of a collaboration project, the first group obtains verification information corresponding to the collaboration project and provides the verification information to the second group. For example, the verification information includes an invitation code (e.g., a character string of several characters), a bar code (e.g., a one-dimensional bar code, a two-dimensional code), or information of any other suitable format without limitations. Further, the first group provides the verification information to the second group via, for example, sending the verification information by an instant messaging application, an e-mail, a short message, or a phone call, oral communication, or any other suitable manner without limitation.

Subsequently, the second group participates in the collaboration project using the verification information. In one example, the second group sends a project participation request, including the verification information, based on the verification of which the second group is confirmed to participate in the collaboration project. As such, a cross-group collaboration between the first group and the second group is implemented. In some embodiments where the collaboration project is created and maintained by the first group, the second group sends the afore-described project participation request to the first group, and the first group performs the verification. In other embodiments where the collaboration project is created and maintained by the server of the cross-group collaboration platform, the second group sends the afore-described project participation request to the server, and the server performs the verification.

In one embodiment, when the first group is a participant of a collaboration project, and the second group is an initiator of the collaboration project, the second group obtains the verification information corresponding to the collaboration project and informs the first group. Subsequently, the first group participates in the collaboration project using the verification information and thereby implements the cross-group collaboration with the second group. In one example, when the collaboration project is created and maintained by the second group, the first group sends the afore-described project participation request to the second group, and the second group performs the verification. In another example, when the collaboration project is created and maintained by the server of the cross-group collaboration platform, the first group sends the afore-described project participation request to the server, and the server performs the verification.

In one embodiment, the first group evaluates or approves the second group's trustworthiness in advance. For example, groups with whom there is a long-term collaborating relationship, and/or groups highly trusted, are pre-configured as trusted groups. This way, if the second group is pre-configured as a trusted group, the first group directly implements the cross-group collaboration with the second group, without the collaboration approval process to improve collaboration efficiency.

In one example, the first group is group AA, the second group is group BB, the third group is group CC, and so on. Many situations exist when these groups share collaboration data. In one situation, collaboration data is shared amongst all groups of AA, BB, and CC. For example, collaboration data of group AA is shared with group BB and group CC, collaboration data of group BB is shared with group AA and group CC, and collaboration data of group CC is shared with group AA and group BB. In other words, collaboration data is shared between any two groups of all the groups participating in the cross-group collaboration. In another situation, a group participating in the cross-group collaboration configures a sharing relationship with at least one other group. For example, group AA configures a sharing relationship with group BB such that collaboration data of group AA is shared with group BB, but not with group CC. On the other hand, group CC can still configure a sharing relationship with group AA to unidirectionally share collaboration data with group AA.

Figure 3:
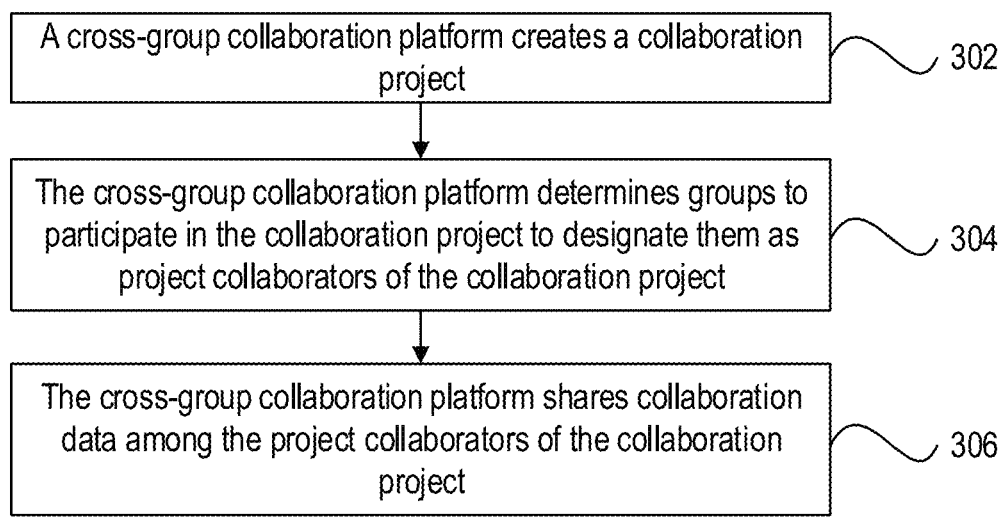
FIG. 3 is a flow diagram illustrating a method for sharing data across groups based on a platform, according to some embodiments of the disclosure.

FIG. 3 is a flow diagram illustrating a method for sharing data across groups based on a platform, according to an embodiment of the disclosure. As shown in FIG. 3, the method performed by a server (e.g., server 11 of FIG. 1) includes the following steps.

Step 302: a cross-group collaboration platform creates a collaboration project.

In one embodiment, the cross-group collaboration platform creates a corresponding collaboration project in response to a project creation request initiated by a group (e.g., the first group or the second group).

In another embodiment, the cross-group collaboration platform creates a collaboration project by itself or creates a collaboration project in other ways without limitation.

In one embodiment, when creating a collaboration project, the cross-group collaboration platform specifies the groups associated with the collaboration project. When the collaboration project is created based on a project creation request initiated by a group, the group specifies the associative groups. For example, groups allowed to participate in the collaboration project are limited to these specified groups, while other groups cannot participate in the collaboration project. For another example, the cross-group collaboration platform sends a project participation invitation to these specified groups such that these groups, in turn, perform an acknowledgment of the project participation invitation and then participate in the collaboration project.

In one embodiment, when creating a collaboration project, the cross-group collaboration platform does not specify groups associated with the collaboration project, instead controls, in other manners, groups participating in the collaboration project. For example, when the collaboration project is created based on a project creation request initiated by a group, the cross-group collaboration platform sends a project participation invitation to the target group, which is indicated by the requesting group. For another example, when the collaboration project is created based on a project creation request initiated by a group, the cross-group collaboration platform provides to the requesting group with the verification information corresponding to the collaboration project, and the requesting group sends the verification information to other groups.

Step 304: the cross-group collaboration platform determines the groups to participate in the collaboration project and designate them as project collaborators of the collaboration project.

In one embodiment, when the collaboration project is created based on a project creation request initiated by any group, the cross-group collaboration platform can determine the group to participate in the collaboration project. For example, when group AA initiates a project creation request to the cross-group collaboration platform, the cross-group collaboration platform creates a corresponding collaboration project, and it is considered by default that group AA participates in the collaboration project.

In one embodiment, when a project participation invitation sent to a target group indicated by the group is acknowledged, the cross-group collaboration platform determines that the target group is to participate in the collaboration project. In one example, when group AA initiates a project creation request to the cross-group collaboration platform such that the cross-group collaboration platform, in turn, creates a corresponding collaboration project, group AA specifies at least one target group to the cross-group collaboration platform. For instance, when group AA indicates that group BB and group CC as target groups, the cross-group collaboration platform sends a project participation invitation for the collaboration project to the target groups, including group BB and group CC. When group BB acknowledges the project participation invitation, it is determined that group BB is to participate in the collaboration project. When group CC does not acknowledge (e.g., refuses to reply or neglects) the project participation invitation, it is determined that group CC is not to participate in the collaboration project. In one example, group AA indicates a target group before a collaboration project is created such that the collaboration project is limited between group AA and the target group indicated by group AA, other groups not allowed to participate in the collaboration project. In another example, group AA indicates a target group after a collaboration project is created. In yet another example, when group AA indicates a target group before a collaboration project is created, group AA updates the target group (e.g., membership to the cross-group collaboration) after the collaboration project is created, without limitation.

In one embodiment, when a received project participation request sent by at least one group includes verification information corresponding to the collaboration project, the cross-group collaboration platform determines that the at least one group is to participate in the collaboration project. In this case, the verification information is accessible (e.g., visible) to a project collaborator of the collaboration project. In one example, when a collaboration project is created based on a project creation request initiated by group AA, group AA is first confirmed as a project collaborator of the collaboration project, and verification information is accessible to group AA such that group AA can send the verification information to a target group such as group BB, with which the collaboration is expected. Subsequently, group BB participates in the collaboration project based on the verification information. In one example, the verification information is accessible to only the project collaborator who initiates the project creation request, e.g., only to group AA in the above-described example. This way, when group BB participates in the collaboration project to become a project collaborator, group BB still is not able to view the verification information. In another example, the verification information is accessible to all the project collaborators. For instance, once group BB participates in the collaboration project to become a project collaborator, group BB can view the verification information and/or sends the verification information to other groups.

In one embodiment, the verification information includes an invitation code (e.g., a character string of several characters), a bar code (e.g., a one-dimensional bar code, a two-dimensional code), or information of any other suitable format, without limitation.

In one embodiment, via the creation of a collaboration project and the designation of groups participating in the collaboration project as project collaborators to share collaboration data, each project collaborator starts or ends collaboration data sharing at any time by participating or leaving the collaboration project, respectively. This way, the project collaborators asynchronously participate in or asynchronously exit the collaboration project. Therefore, there is no need to synchronously start or synchronously end the data sharing, contingent upon an agreement being reached among all the project collaborators. Further, in this way, it is convenient to quickly implement collaboration amongst a plurality of groups. In the scenarios where some project collaborators have not joined or exited the collaboration project, partial collaboration amongst other project collaborators is not impacted, leading to improved collaboration efficiency.

Step 306: the cross-group collaboration platform shares collaboration data amongst the project collaborators of the collaboration project.

In one embodiment, the cross-group collaboration platform shares collaboration data of any project collaborator with all the project collaborators in the collaboration project. In one example, when group AA, group BB, and group CC are project collaborators of the same collaboration project, collaboration data of group AA is shared with group BB and group CC, collaboration data of group BB is shared with group AA and group CC, and collaboration data of group CC is shared with group AA and group BB. This way, collaboration data is shared between any two project collaborators of all the project collaborators.

In one embodiment, the cross-group collaboration platform obtains a sharing relationship configuration request initiated by a project collaborator. In turn, the cross-group collaboration platform shares collaboration data of the project collaborator with one or more project collaborators indicated in the sharing relationship configuration request and avoids sharing the collaboration data of the project collaborator with other project collaborators. In one example, when group AA, group BB, and group CC are project collaborators of the same collaboration project, group AA selects a project collaborator to share data within a sharing relationship configuration request. For instance, when a sharing relationship selected by group AA includes group BB, data of group AA to be shared is shared with group BB, not with group CC. Further, each project collaborator can configure a sharing relationship for its own collaboration data.

In one embodiment, when some project collaborators exit the collaboration project, the cross-group collaboration platform continues to share collaboration data amongst the remaining project collaborators, without terminating the sharing. When a sharing policy adopted by the cross-group collaboration platform is to share collaboration data of any project collaborator with all the project collaborators in the collaboration project, the membership of "all the project collaborators" is updated to the "remaining project collaborators," and the sharing policy is continuously implemented. When the cross-group collaboration platform determines a share-to group corresponding to a project collaborator based on a sharing relationship configuration request, the collaboration data of the project collaborators that have exited is no longer shared with the remaining project collaborators, and the collaboration data of the remaining project collaborators is no longer shared with the project collaborators that have exited.

In one embodiment, when share-to groups set by a project collaborator all exit the collaboration project, and the project collaborator does not belong to any sharing relationships with other project collaborators, the project collaborator is removed from the collaboration project to prevent the project collaborator from occupying resources associated with of the collaboration project.

In one embodiment, the cross-group collaboration platform stores collaboration data generated by the project collaborators in a shared space corresponding to the collaboration project, the shared space providing access permissions to the project collaborators of the collaboration project. In one example, the shared space corresponding to the collaboration project is located on the cross-group collaboration platform. In other examples, the shared space corresponding to the collaboration project is located in a storage space outside the cross-group collaboration platform without limitation. In this case, collaboration data generated by all the project collaborators of the same collaboration project is stored in a shared space corresponding to the collaboration project in a unified way such that a project collaborator can conveniently share and utilize the collaboration data in the shared space, resulting in improved sharing efficiency.

In one embodiment, the cross-group collaboration platform records collaborator data generated by each project collaborator in a corresponding collaborator shared space. This way, the cross-group collaboration platform implements automatic collaboration data synchronization of the respective collaborator shared spaces that correspond to the project collaborators of the collaboration project. In this case, a project collaborator records collaboration data using its corresponding collaborator shared space, which better suits the actual situation (e.g., network conditions, storage space sizes) of the corresponding project collaborator. In one example, the collaborator shared space is a local storage space of the project collaborator. When the network is not stable, the project collaborator still ensures that the collaboration data is stored in the local storage space. After the network returns to a stable state, the cross-group collaboration platform automatically synchronizes the collaboration data amongst the collaborator's shared spaces.

In some embodiments, when the cross-group collaboration platform automatically synchronizes collaboration data amongst the collaborator shared spaces, periodic (or triggered) full data synchronization or incremental data synchronization is applied. For example, when collaboration data in a collaborator shared space is edited, and/or there is newly added collaboration data, the edited collaboration data and/or newly added collaboration data is synchronized to other collaborator shared spaces without delay. Other mechanisms of data synchronization schemes can be adopted without limitation.

In one embodiment, the cross-group collaboration platform records access rights assigned by a project collaborator to the collaboration data in its own internal system. The access rights become invalid when a corresponding project collaborator exits the collaboration project. When a project collaborator initiates an access request for the collaboration data of another project collaborator, the cross-group collaboration platform facilitates, via the recorded access rights to the internal system of the other project collaborator, the project collaborator to access the collaboration data in the internal system of the other project collaborator. In this case, a project collaborator records collaboration data in its own internal system, and internal group members associated with the project collaborator conveniently retrieve and use the relevant collaboration data. At the same time, the access rights are recorded at the cross-group collaboration platform rather than being assigned to the other project collaborators, limiting the abuse of the access rights by the other project collaborator and ensuring that an access operation on an internal system is implemented under the management of the cross-group collaboration platform. In one example, when a project collaborator initiates an access request for the collaboration data of another project collaborator, the cross-group collaboration platform separately establishes, based on the recorded access rights to an internal system of the other project collaborator, access channel(s) between the cross-group collaboration platform and the project collaborator, and access channel(s) between the cross-group collaboration platform and the other project collaborator. This way, the project collaborator implements secure access to the other project collaborator via the cross-group collaboration platform.

In one embodiment, an access scope of the access rights to the corresponding internal system includes at least one of the following: a specified access path, data of specified rights, data of a specified type, data generated in a specified time period, data generated by employees in a specified department, and on the like, without limitations.

Figure 4A:
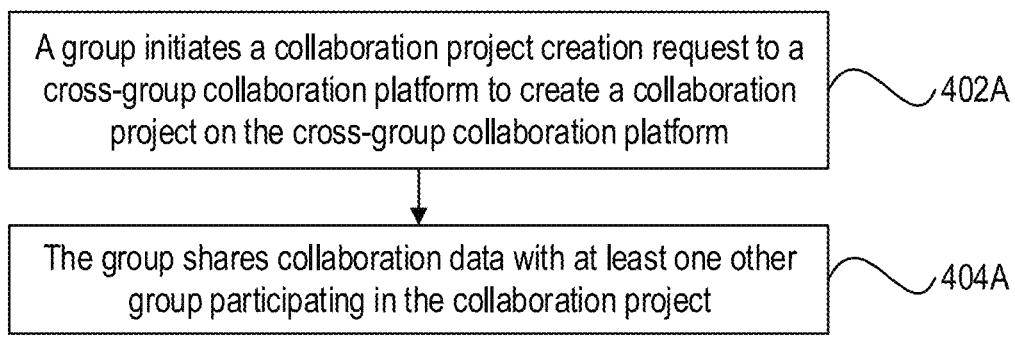
FIG. 4A is a flow diagram illustrating a method for sharing data across groups based on a collaboration project creator, according to some embodiments of the disclosure.

FIG. 4A is a flow diagram illustrating a method for sharing data across groups based on a creating group, according to an embodiment of the disclosure. As shown in FIG. 4A, the method performed at an electronic device (e.g., the mobile phones 131, 141, and 151, the PCs 132, 142, and 152 of FIG. 1) includes the following steps.

Step 402A: a group initiates a collaboration project creation request to a cross-group collaboration platform to create a collaboration project on the cross-group collaboration platform.

Step 404A: the group shares collaboration data with at least one other group participating in the collaboration project.

In one embodiment, the group specifies a target group related to the collaboration project to the cross-group collaboration platform, and the cross-group collaboration platform sends a project participation invitation to the target group. When the project participation invitation is acknowledged by the target group, the target group is confirmed as participating in the collaboration project.

In one embodiment, the group starts a collaboration approval process for the target group. When the collaboration approval process for the target group is approved, the group specifies the target group to the cross-group collaboration platform such that the cross-group collaboration platform sends a project participation invitation to the target group. In another embodiment, the group evaluates or approves the trustworthiness of other groups in advance and pre-configures groups with which there is long-term collaboration and/or groups highly trusted as trusted groups. As such, when the target group is a pre-configured trusted group, the group indicates the target group to the cross-group collaboration platform without the collaboration approval process. This way, the cross-group collaboration platform sends a project participation invitation to the target group, thereby improving the efficiency of the target group participating in the collaboration project.

In one embodiment, the group obtains the verification information corresponding to the collaboration project, the verification information being recorded in the cross-group collaboration platform. Afterward, the group sends the verification information to a target group, which is confirmed as participating in the collaboration project upon sending a project participation request including the verification information to the cross-group collaboration platform. According to various embodiments, the verification information includes an invitation code (e.g., a character string of several characters), a bar code (e.g., a one-dimensional bar code, a two-dimensional code), or information of any suitable format without limitation.

In one embodiment, the group starts a collaboration approval process for the target group and sends the verification information to the target group when the collaboration approval process for the target group is approved. In another embodiment, when the target group is a pre-configured trusted group, the group sends the verification information to the target group without the collaboration approval process.

In one embodiment, the above-described initiating group is group AA, and the other groups participating in the collaboration project include group BB, group CC, and so on. Many situations exist when these groups share collaboration data. In one situation, collaboration data is shared amongst all groups. For example, collaboration data of group AA is shared with group BB and group CC, collaboration data of group BB is shared with group AA and group CC, and collaboration data of group CC is shared with group AA and group BB. in other words, collaboration data is shared between any two project collaborators of all the project collaborators. In another situation, a group participating in the collaboration project initiates a sharing relationship configuration request to the cross-group collaboration platform and configures at least one group participating in the collaboration project as a share-to group. For example, when group AA sets group BB as a share-to group, collaboration data of group AA is shared with group BB, but not with group CC. On the other hand, group CC can still set group AA as a share-to group to unidirectionally share collaboration data with group AA.

Figure 4B:
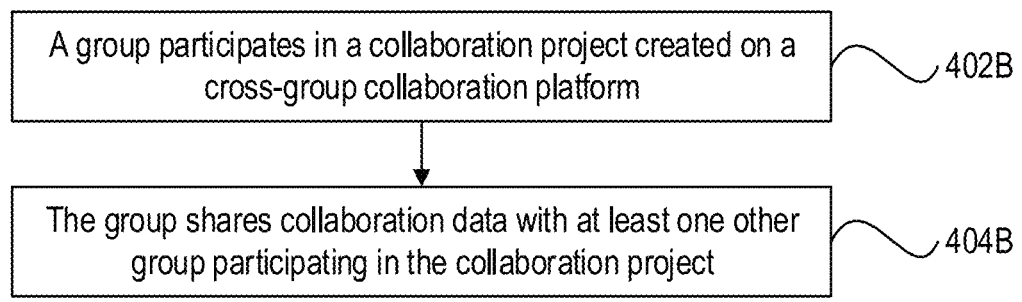
FIG. 4B is a flow diagram illustrating a method for sharing data across groups based on a collaboration projection participant, according to some embodiments of the disclosure.

FIG. 4B is a flow diagram illustrating a method for sharing data across groups based on a participant group, according to an embodiment of the disclosure. As shown in FIG. 4B, the method performed at an electronic device (e.g., the mobile phones 131, 141, and 151, the PCs 132, 142, and 152 of FIG. 1) includes the following steps.

Step 402B: a group participates in a collaboration project created on a cross-group collaboration platform.

In one embodiment, the collaboration project is created according to, for example, the embodiment illustrated in FIG. 3. In other embodiments, the collaboration project is created in other manners, without limitation disclosure.

In one embodiment, after receiving a project participation invitation sent by the cross-group collaboration platform, the group acknowledges the project participation invitation to participate in the collaboration project. The cross-group collaboration platform sends a project participation invitation to the group under the instruction of a group requesting to create the collaboration project, or a group already participating in the collaboration project.

In one embodiment, after receiving the project participation invitation, the group starts a collaboration approval process for another group participating in the collaboration project. Once the collaboration approval process for the other group is approved, the group acknowledges the project participation invitation. In another embodiment, when the other groups are pre-configured as trusted groups, the group acknowledges the project participation invitation without the collaboration approval process.

In one embodiment, after receiving verification information sent by another group already participating in the collaboration project, the group sends a project participation request including the verification information to the cross-group collaboration platform to participate in the collaboration project corresponding to the verification information.

In one embodiment, the group starts a collaboration approval process for the other group, which sends the verification information. When the collaboration approval process for the other group is approved, the group sends a project participation request including the verification information to the cross-group collaboration platform. In another embodiment, when the other group is a pre-configured trusted group, the group sends a project participation request including the verification information to the cross-group collaboration platform without the collaboration approval process.

Step 404B: the group shares collaboration data with at least one other group participating in the collaboration project.

In one embodiment, the afore-described participant group is group AA, and the other groups participating in the collaboration project include group BB, group CC, and so on. Many situations exist when these groups share collaboration data. In one situation, collaboration data is shared amongst all groups. For example, collaboration data of group AA is shared with group BB and group CC, collaboration data of group BB is shared with group AA and group CC, and collaboration data of group CC is shared with group AA and group BB. In other words, the collaboration data is shared between any two project collaborators of all the project collaborators. In another situation, a group participating in the collaboration project initiates a sharing relationship configuration request to the cross-group collaboration platform and configures at least one group participating in the collaboration project as a share-to group. For example, when group AA sets group BB as a share-to group, collaboration data of group AA is shared with group BB, but not with group CC. On the other hand, group CC can still set group AA as a share-to group to unidirectionally share collaboration data with group AA.

In some embodiments, an operation by a "group," as described above, is a corresponding operation via a user account belonging to a corresponding group. For example, the operation includes collaboration management operations such as initiating a project creation request, initiating a project participation request, sending verification information, performing an acknowledgment, or indicating a target group; collaboration operations such as implementing project collaboration or generating collaboration data, without limitations.

For the ease of understanding, the technical solutions provided in embodiments of the disclosure are described below using a cross-enterprise research and development collaboration in an exemplary enterprise scenario. However, as used herein, the term "groups" may further include many other types of entities such as schools, hospitals, troops, and government agencies in addition to enterprises, without limitations.

In this example, research and development collaboration needs to be implemented amongst enterprise AA, enterprise BB, and enterprise CC. Clients of a cross-group collaboration platform are configured to execute on the electronic devices used by the enterprise members of enterprise AA, enterprise BB, and enterprise CC. An enterprise member of enterprise AA logs in to his or her own user account on a corresponding client, and configures the client as collaboration node 1, corresponding to enterprise AA. Similarly, an enterprise member of enterprise BB logs in to his or her own user account on a corresponding client, and configures the client as collaboration node 2, corresponding to enterprise BB, and an enterprise member of enterprise CC logs in to his or her own user account on a corresponding client, and configures the client as collaboration node 3, corresponding to enterprise CC.

Taking enterprise AA as an example, a number of enterprise members associate with enterprise AA, each of whom has the clients of the cross-group collaboration platform running on their respective electronic devices. Although these enterprise members log in to different user accounts on the respective clients, since these enterprise members belong to enterprise AA, the corresponding clients are all treated as being configured as the above-described collaboration node 1. That is, the "collaboration node 1" is implemented as a collection of clients at which the enterprise members of enterprise AA log in, rather than an individual client corresponding to a user account of an individual enterprise member of enterprise AA. Similarly, collaboration node 2 of enterprise BB and collaboration node 3 of enterprise CC include similar "collections," the description of which is not repeated herein.

Figure 5:
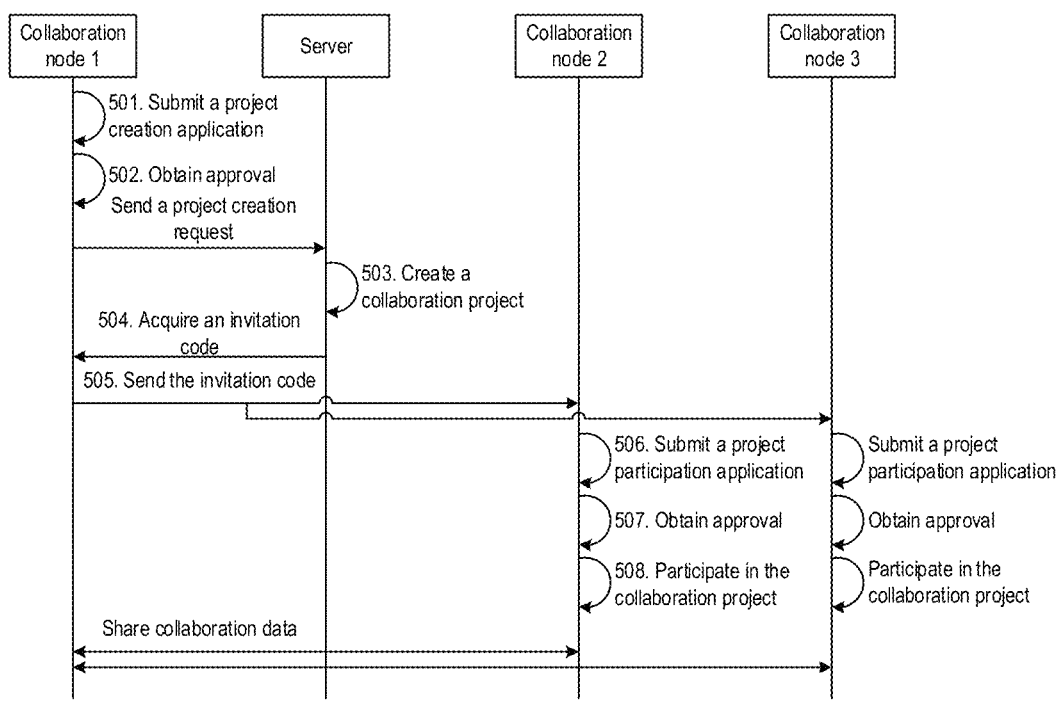
FIG. 5 is a flow diagram illustrating an interaction process implementing a cross-enterprise collaboration according to some embodiments of the disclosure.

FIG. 5 is a flow diagram illustrating an interaction process implementing a cross-enterprise collaboration according to an embodiment of the disclosure. In this example, the interaction process shown in FIG. 5 amongst the above-described collaboration nodes 1, 2, 3, and a server of the cross-group collaboration platform implements a research and development collaboration amongst enterprise AA, enterprise BB, and enterprise CC. The following illustrates the interaction process with references to FIGS. 6-13. As shown in FIG. 5, the interaction process includes the following steps.

Step 501: collaboration node 1 submits a project creation application.

In one embodiment, enterprise AA initiates a creation operation for a collaboration project, and a project creation application is submitted within enterprise AA to request the creation of a corresponding collaboration project. In one example, such an application is submitted at an exemplary project creation application user interface, as illustrated in FIG. 6. Here, a member Xiaobai of enterprise AA is to initiate an application, and collaboration node 1 is configured to provide the project creation application interface 600, as shown in FIG. 6. Upon selecting a tag 602, Xiaobai enters the project creation application interface 600 to create a collaboration project. Upon selecting a tag 604, Xiaobai enters a corresponding project participation application interface to participate in a collaboration project created by another enterprise.

In one embodiment, at the project creation application interface 600, Xiaobai needs to fill out the content related to the collaboration project. For example, information such as a project name, project description, shared content, project leader, project member, and collaborator enterprise(s) is entered at the project creation application interface 600. The "Shared content" element represents the types of collaboration data that enterprise AA shares with the collaborator enterprise in the collaboration project. For example, and as illustrated herein, boxes corresponding to "Basic information of project," "Project member information," and "Data and configuration related to work project" are checked to indicate that those types of information is to be shared. In other examples (not shown), when boxes corresponding to some types of collaboration data are not checked, those types of data is not to be shared. In other embodiments, in addition to the above-described types of collaboration data, other types of collaboration data (not shown) can be specified as well, without limitations. The "Project leader" and "Project member" elements represent members (with different roles) in enterprise AA related to the collaboration project. As such, the specified members participate in the collaboration project and share collaboration data with the collaborator enterprise(s), after logging in to collaboration node 1. In contrast, other members of enterprise AA cannot operate the same way. The "Collaborator enterprise" element includes one or more enterprises registered on the cross-group collaboration platform. For example, by entering an enterprise name, an enterprise ID or the like, Xiaobai adds a corresponding enterprise as the collaborator enterprise to the "Collaborator enterprise" element.

Still referring to FIG. 6, in this example, the title of the collaboration project to be created is entered as "Project X" at the text box corresponding to the "Project name" element. The description for the collaboration project is entered as "Collaborative research and development for new products meeting user requirements . . . ," at the text box corresponding to the "Project description" element. The project leader of enterprise AA is entered as "Xiaobai," the project members are entered as "Baibai" and "Xiaohei," and the collaborator enterprises are entered as "enterprise BB" and "enterprise CC." Also, as illustrated herein, collaboration data generated by enterprise AA that is allowed for sharing with the collaborator enterprises includes information on topics such as "Basic information of project," "Project member information," and "Data and configuration related to work project." After confirming that no mistake exists, Xiaobai submits a project creation application for "Project X" by triggering an option of "Submit Application" in the project creation application interface 600.

Step 502: collaboration node 1 determines whether the project creation application is approved; and in response to the application being approved, sends a project creation request to the server.

In one embodiment, collaboration node 1 starts an internal approval operation in response to the project creation application for "Project X." In one example, such approval operation is provided via an exemplary approval interface 700 as illustrated in FIG. 7. The approval interface 700 of FIG. 7 includes a section of "Approval process" in the upper portion and a section of "Content for approval" in the lower portion. As shown herein, the "Approval process" section displays that approving authorities for the project creation application include Xiaobai's director and second-level director. The approving authorities conduct an approval operation on the project creation application after viewing the information in the section of "Content for approval." Further, Xiaobai and the approving authorities can check the approval progress for the project creation application, via the "Approval process" section throughout the approval process. In one example, once Xiaobai submits the application, the application is reviewed by the director; after the director approves the application, the application is reviewed by the second-level director; after the second-level director approves the application, it is confirmed that the application has been approved.

In some embodiments, step 502 is not mandatory. In some scenarios, the approval process is completely omitted. In some other scenarios, the approval process is improved. For example, when a collaborator enterprise is a pre-configured trusted collaborator, the approval process is omitted, or direct approval is obtained without requiring the director and the second-level director to manually review the application for approval, resulting in speedy creation of a collaboration project. The configuration of the "trusted collaborator" is described in detail below.

Further, in this example, Xiaobai enters the application information via the project creation application interface 600, and Xiaobai is the project leader of the collaboration project. However, the member who enters information at the project creation application interface 600 does not necessarily need to be the project leader in other examples.

Step 503: the server creates a corresponding collaboration project based on the project creation request sent by collaboration node 1.

Step 504: the server generates a unique corresponding invitation code for the created collaboration project, and the invitation code is obtained by collaboration node 1.

Step 505: collaboration node 1 sends the invitation code to collaboration node 2 corresponding to enterprise BB and collaboration node 3 corresponding to enterprise CC.

In some embodiments, enterprise BB and enterprise CC are both added to the collaboration project created by enterprise AA using the invitation code. This way, it avoids the addition of irrelevant enterprises, improving data security during cross-enterprise collaborations. In one example as shown in FIG. 7, after the approval is obtained, collaboration node 1 is configured to retrieve an invitation code through interactions with the server, and display the invitation code in the approval interface 700, as part of the information displayed in the section of "Approval process.". For example, the invitation code illustrated in FIG. 7 is a character string of "b11fce."

In one embodiment, collaboration node 1 provides a transmitting functionality for an invitation code so that to quickly send the invitation code (e.g., the one shown in the approval interface 700) to collaboration node 2 and collaboration node 3. In other embodiments, a member of enterprise AA such as Xiaobai sends an invitation code to members of enterprise BB and enterprise CC via, e.g., an instant messaging application, an e-mail, a short message, a phone call, or any other mechanisms without limitation.

Figure 8:
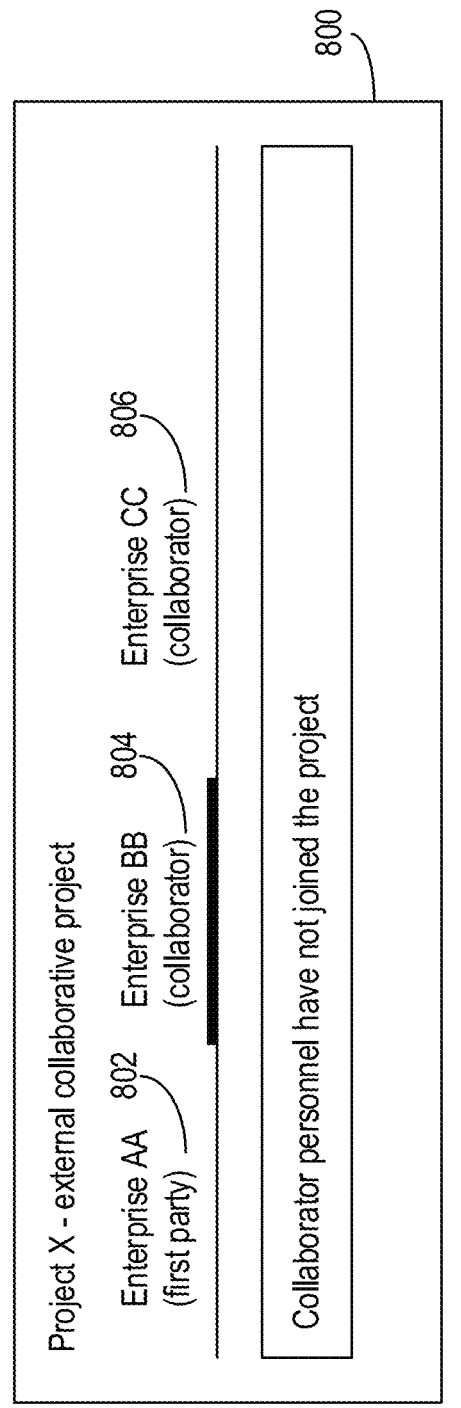
FIG. 8 is a diagram illustrating a project management interface according to some embodiments of the disclosure.

In one embodiment, after the above-described collaboration project X is created, the project leader and project member(s) of enterprise AA can review and access the relevant information of project X after logging in to collaboration node 1. In one example, such access is provided at an exemplary project management interface 800 as illustrated in FIG. 8. In this example, Xiaobai accesses the project management interface 800 of FIG. 8 to view the relevant information of project X, after logging in to collaboration node 1. The project management interface 800 provides tags 802, 804, and 806 that correspond to enterprise AA serving as a first party, enterprise BB as a collaborator, and enterprise CC also as collaborators, respectively. Upon selecting the tag 804 corresponding to enterprise BB, which has not yet participated in the collaboration project, Xiaobai is presented with a message of "Collaborator personnel have not joined the project" displayed at the project management interface 800.

In various examples, enterprise BB and enterprise CC may not both participate in the collaboration project created by enterprise AA. In one example, only enterprise BB participates in the collaboration project whereas enterprise CC does not participate in the collaboration project. As such, enterprise AA still shares data with enterprise BB during research and development collaboration, without being affected by the non-participation of enterprise CC in the collaboration project. In another example, if enterprise BB and enterprise CC have not participated in the collaboration project, enterprise AA can take the lead to participate in the collaboration project, and generate corresponding collaboration data, without being affected by the non-participation of both enterprise BB and enterprise CC. This way, the project participants participate in the collaboration project asynchronously, without unnecessary association or influence amongst them. It is not required for all the project participants to confirm before a collaboration project is created or undertaken by participants, resulting in simplified operations and improved efficiency.

Step 506: collaboration node 2 and collaboration node 3 separately submit a project participation application.

Figure 9:
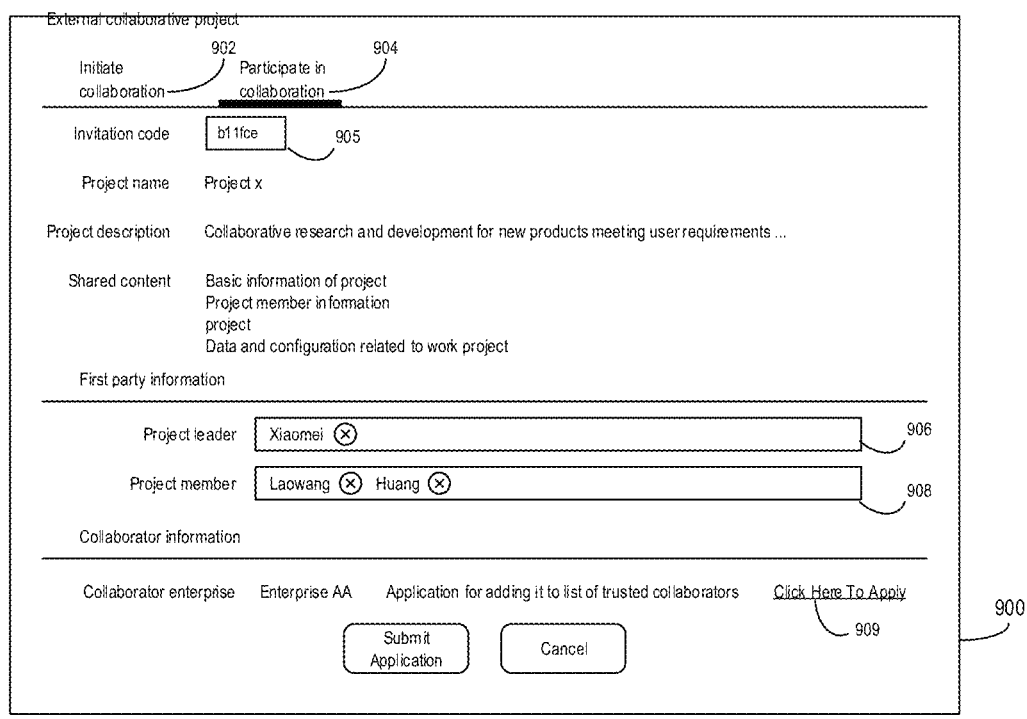
FIG. 9 is a diagram illustrating a project participation application interface according to some embodiments of the disclosure.

In one embodiment, such project participation application is submitted via an exemplary project participation application interface 900 as illustrated in FIG. 9. As shown in FIG. 9, the project participation application interface 900 includes tags 902 to 904. When the tag 902 is triggered, a corresponding project creation application interface (e.g., the project creation application interface 600 of FIG. 6) is presented for creating a collaboration project. As shown herein FIG. 9, when the tag 904 is triggered, the project participation application interface 900 is presented for participating in a collaboration project created by another enterprise.

In this example, to partake in the collaboration project X created by Xiaobai, a member of enterprise BB enters the project participation application interface 900 as illustrated in FIG. 9, on collaboration node 2. The process for a member of enterprise CC to participate in the collaboration project X on collaboration node 3 is substantially similar to the process for enterprise BB.

As shown in FIG. 9, the project participation application interface 900 provides an input box 905 for entering an invitation code. In the example shown in FIG. 9, "b11fce" provided by collaboration node 1 is entered into the input box 905. As a result, the relevant information of the collaboration project X, such as project name, project description, shared content, and collaborator information (e.g., collaborator enterprise being enterprise AA) is displayed in the project participation application interface 900. Further, the member of enterprise BB configures the information on the enterprise BB side's related to project leader and project member in a section of "First party information." In this example illustrated in FIG. 9, the member of enterprise BB sets the project leader as "Xiaomei" and project members as "Laowang," and "Huang," using text boxes 906 and 908, respectively. After confirming no mistakes exist, a project participation application for "Project X" is submitted by triggering an option of "Submit Application" in the project participation application interface 900.

Step 507: collaboration node 2 and collaboration node 3 separately determine whether the respective project participation application is approved; and in response to an approval, proceed to step 508.

In one embodiment, collaboration node 2 starts an internal approval operation in response to the submitted project participation application for "Project X." In one example, such approval operation is provided at an exemplary approval interface 1000 as illustrated in FIG. 10. The approval interface 1000 of FIG. 10 includes a section of "Approval process" in the upper portion, and a section of "Content for approval" in the lower portion. As displayed in the section of "Approval process," the approving authorities for the project participation application include Xiaomei's director and second-level (assume that the project participation application is submitted by Xiaomei using the project participation application interface 900 shown in FIG. 9). The approving authorities conduct an approval operation on the project participation application after viewing the section of "Content for approval." In this example, Xiaomei and the approving authorities can view the approval progress for the project participation application at the section of "Approval process" throughout the approval process. After Xiaomei submits the application, the application is reviewed by the director; after the director approves the application, the application is reviewed by the second-level director; after the second-level director approves the application, it is confirmed that the application is approved.

In some embodiments, step 507 is not mandatory. In some scenarios, the approval process is completely omitted. In some other scenarios, the approval process is improved. For example, when the collaborator enterprise is a pre-configured trusted collaborator, the approval process is omitted or direct approval is obtained without requiring the director or the second-level director to manually approve the application, thereby facilitating speedy participation in a collaboration project.

The configuration of the "trusted collaborator" is substantially similar to the "trusted collaborator" described with connection to step 502 above. In implementations, approving the creation of or participation in a collaboration project takes into consideration such as whether a collaborator enterprise is trustworthy, and/or whether a collaboration risk exists. Thus, for those general collaborator enterprises, the result of a single approval is applicable to only one instance of creating of or participating in a corresponding collaboration project (e.g., the collaboration project the collaborator enterprise participates in), whereas for those trustworthy enterprises, or enterprises of long-term collaboration relationships, a status of "trusted collaborators" is configured, or the enterprise is added to a "list of trusted collaborators" upon a single approval. In the latter cases, a result of the approval operation is applicable to many processes of creating of or participating in a corresponding collaboration project. In some examples, a result of the approval operation is applicable to all processes of creating of or participating in a corresponding collaboration project in a certain time period (e.g., one year) to avoid implementing the approval operation for each creation of or participation in a corresponding collaboration project.

In one example, the above-described operation to add a trusted collaborator is approved using an exemplary approval interface for adding a trusted collaborator 1100 as illustrated in FIG. 11. When a link 909 of "Click Here To Apply" in the project participation application interface 900 of FIG. 9 is operated, an approval operation for configuring enterprise AA as a "trusted collaborator" of enterprise BB may be initiated. Thus, the corresponding approval progress is viewed in, for example, the approval interface 1100 of FIG. 11. Similarly, a link of "Click Here To Apply" or a similar option may also be displayed in relation to a collaborator enterprise to be added, in the project creation application interface 600 of FIG. 6 to quickly add the corresponding collaborator enterprise as a trusted collaborator.

Step 508: collaboration node 2 and collaboration node 3 share collaboration data with collaboration node 1, after separately participating in the collaboration project.

Figure 12:
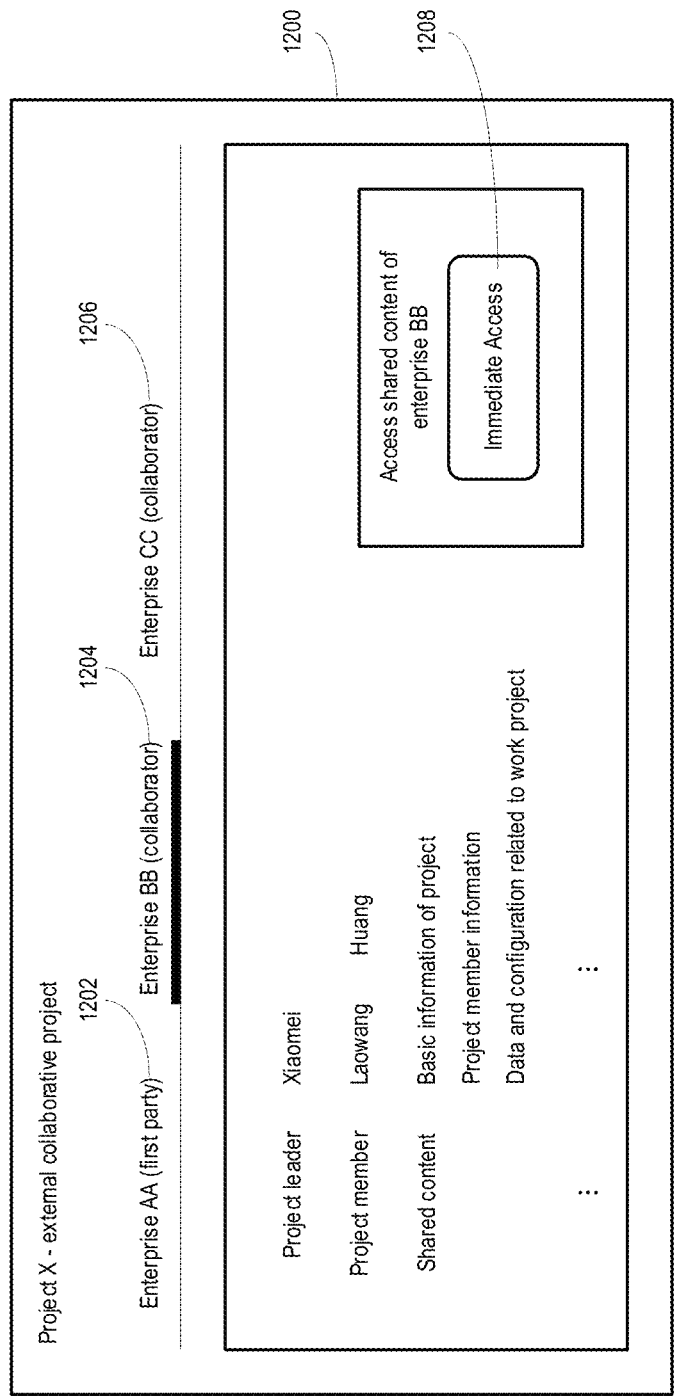
FIG. 12 is a diagram illustrating another project management interface provided according to some embodiments of the disclosure.

FIG. 12 is a diagram illustrating another project management interface according to an embodiment of the disclosure. In this example, Xiaobai enters the project management interface 1200 of FIG. 12 to view the relevant information of project X, after logging in to collaboration node 1. The project management interface 1200 provides tags 1202, 1204, and 1206 to respectively correspond to enterprise AA serving as a first party, and enterprise BB and enterprise CC serving as collaborators. When Xiaobai selects the tag 1204 corresponding to enterprise BB, which at this point has already participated in the collaboration project, the information pertaining to enterprise BB is displayed at the project management interface 1200. As illustrated in this example, the project leader is "Xiaomei," the project members are "Laowang" and "Huang," the shared content includes "Basic information of project," and "Project member Information," and "Data and configuration related to work project."

In one embodiment, the project management interface 1200 includes an access option 1208 as illustrated in FIG. 12. Enterprise members such as Xiaobai, Baibai, and Xiaohei on collaboration node 1 quickly access the shared collaboration data generated by enterprise BB by triggering the access option 1208. Similarly, enterprise members such as Xiaobai, Baibai, and Xiaohei on collaboration node 1, via operating the tag 1206, obtain access to an option corresponding to enterprise CC and thereby quickly access the shared collaboration data generated by enterprise CC.

Similarly, enterprise members such as Xiaomei, Laowang, and Huang on collaboration node 2, or enterprise members on collaboration node 3 obtain an access option corresponding to enterprise AA by triggering the tag 1202, and thereby quickly access the shared collaboration data generated by enterprise AA.

Many situations exist for enterprise BB and enterprise CC. For example, in one situation, sharing of collaboration data is allowed only between a "first party" and a "collaborator" of a collaboration project, but not allowed between "collaborators." Thus, collaboration data is shared between enterprise AA and enterprise BB, and between enterprise AA and enterprise CC, but not allowed between enterprise BB and enterprise CC. In another situation, all participants of a collaboration project share collaboration data with one another. In other words, collaboration data is shared between enterprise AA and enterprise BB, between enterprise AA and enterprise CC, and between enterprise BB and enterprise CC.

Any suitable mechanisms are applicable to implementing storage and access of the collaboration data generated by the collaboration nodes, without limitations.

In one embodiment, each collaboration node has a corresponding storage space. For example, collaboration node 1 corresponds to storage space 1, which is used for storing collaboration data generated by an enterprise member of enterprise AA; collaboration node 2 corresponds to storage space 2, which is used for storing collaboration data generated by an enterprise member of enterprise BB; collaboration node 3 corresponds to storage space 3, which is used for storing collaboration data generated by an enterprise member of enterprise CC. The location of a storage space is not limited in embodiments of the disclosure. For example, a storage space may include one or more of: a cloud space, a local space, a public space, and a system space within an enterprise. In the above-described example, when participating in the collaboration project X, each project participant assigns the access rights to its own storage space to the server of the cross-group collaboration platform. For example, enterprise AA assigns the access rights of storage space 1, enterprise BB assigns the access rights of storage space 2, and enterprise CC assigns the access rights of storage space 3, to the server of the cross-group collaboration platform. This way, when Xiaobai triggers the access option 1208 of FIG. 12, after verifying that Xiaobai being associated with collaboration node 1, the server of the cross-group collaboration platform enables accesses to storage space 2 on collaboration node 1, using the access rights assigned by enterprise BB for storage space 2. As such, not only the collaboration data is shared, but also data security of the storage spaces is ensured.

In some embodiments, in addition to accessing the storage spaces corresponding to the collaboration ends, the server of the cross-group collaboration platform actively performs data synchronization amongst the storage spaces corresponding to the collaboration ends. This way, each project participant only needs to access its own storage space to access the collaboration data generated by all the project participants, which results in further simplified operations.

Figure 13:
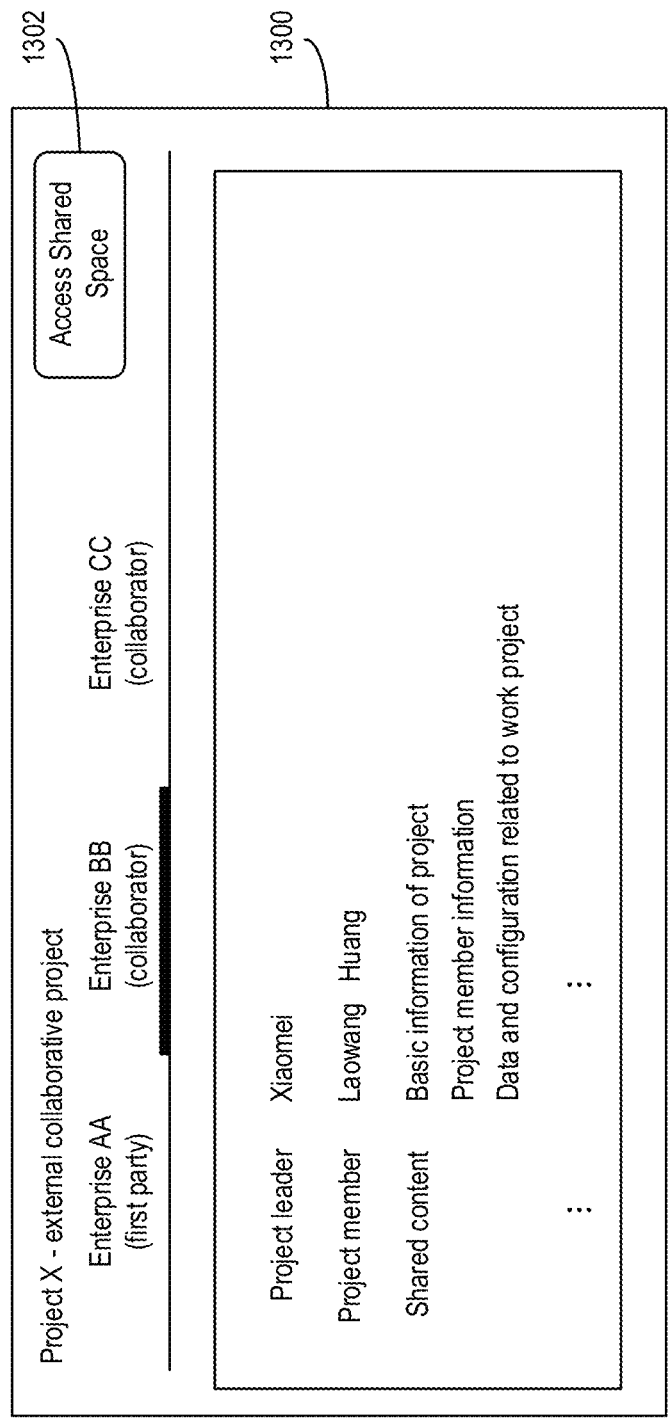
FIG. 13 is a diagram illustrating yet another project management interface according to some embodiments of the disclosure.

In one embodiment, the collaboration project has a corresponding unified storage space, and all collaboration nodes correspond to the unified storage space and store generated collaboration data in the unified storage space. FIG. 13 is a diagram illustrating another project management interface according to an embodiment of the disclosure. The project management interface 1300 of FIG. 13 includes an access option 1302 corresponding to all project participants. Enterprise AA, enterprise BB, and enterprise CC all can access a unified storage space corresponding to the collaboration project X, by operating the access option 1302. When sharing of collaboration data is allowed only between a "first party" and a "collaborator" of a collaboration project, and not allowed between "collaborators," the server of the cross-group collaboration platform limits, based on the identity information of a party operating the access option 1302, the collaboration data accessible by the operating party in the unified storage space. In one example, when the operating party belongs to enterprise AA, collaboration data generated by enterprise AA itself, enterprise BB, and enterprise CC can be accessed. When the operating party belongs to enterprise BB, collaboration data generated by enterprise BB itself and enterprise AA can be accessed, and collaboration data generated by enterprise CC cannot be accessed. When the operating party belongs to enterprise CC, collaboration data generated by enterprise CC itself and enterprise AA can be accessed, and collaboration data generated by enterprise BB cannot be accessed.

In one embodiment, a participant of the collaboration project may exit at any time. For example, after enterprise CC exits, enterprise AA still shares collaboration data with enterprise BB. In one example, after enterprise CC exits the collaboration project, the server of the cross-group collaboration platform maintains the access rights of enterprise AA and enterprise BB to the collaboration data of enterprise CC. In another example, enterprise CC sets the access rights to the collaboration data such that after enterprise CC exits the collaboration project, enterprise AA and enterprise BB no longer can access the collaboration data generated by enterprise CC.

Figure 14:
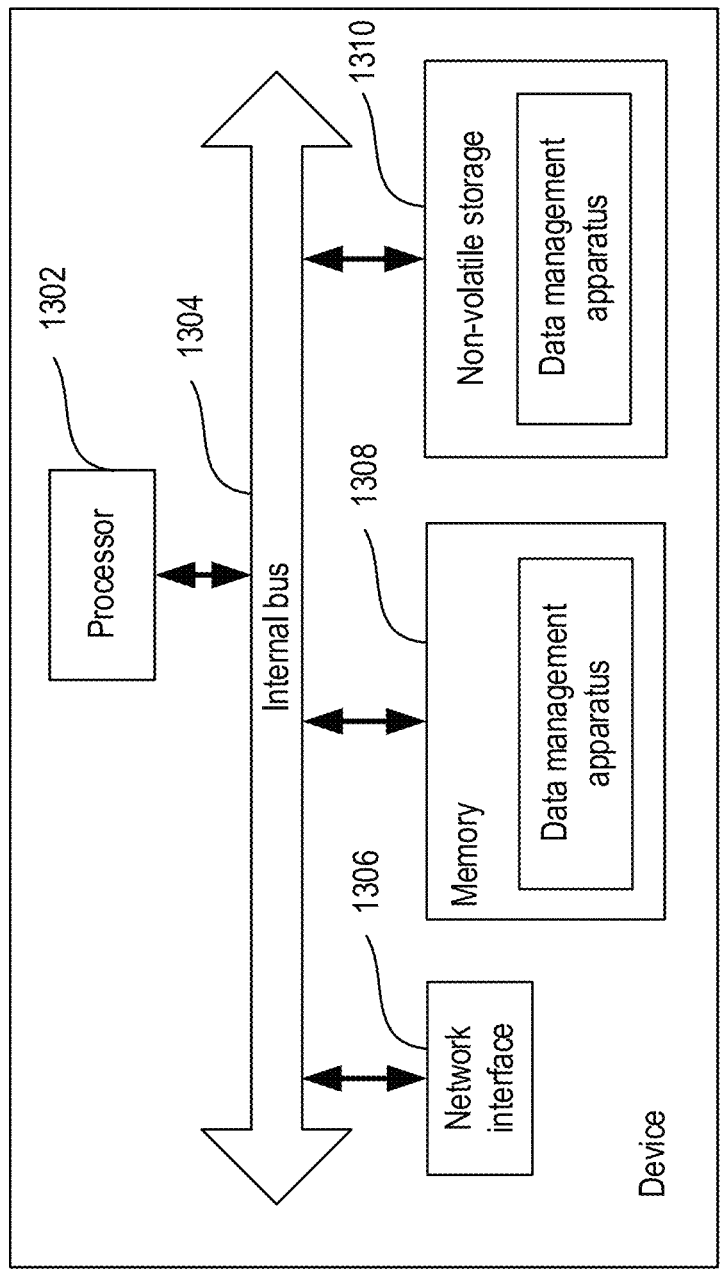
FIG. 14 is a block diagram illustrating a device according to some embodiments of the disclosure.

FIG. 14 is a block diagram illustrating a device according to an embodiment of the disclosure. As shown in FIG. 14, the device includes a processor (1402), an internal bus (1404), a network interface (1406), a memory (1408), and a non-volatile storage (1410) on the hardware level, and may further include hardware required by other services. The processor (1402) reads a corresponding computer program into the memory (1408) from the non-volatile storage (1410) and then runs the computer program to form an apparatus for sharing data across groups on the logical level. Certainly, in addition to the software implementation, one or more embodiments of the disclosure do not exclude other implementations, for example, using a logical device or a combination of software and hardware. That is to say, execution entities of the following processing flows are not limited to logical units, and may also be hardware or logical devices.

Figure 15:
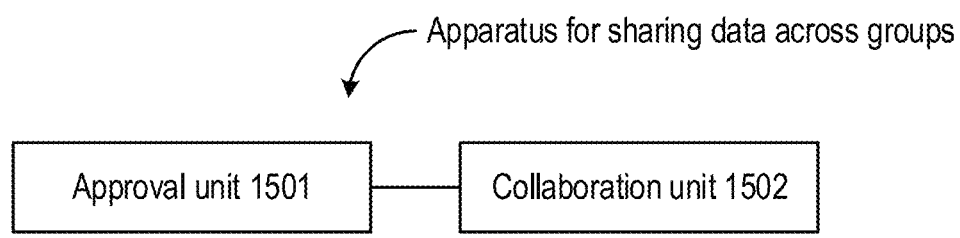
FIG. 15 is a block diagram illustrating an apparatus for sharing data across groups according to some embodiments of the disclosure.

FIG. 15 is a block diagram illustrating a software implementation of an apparatus for sharing data across groups based on a platform, according to an embodiment of the disclosure. As shown in FIG. 15, the apparatus includes an approval unit (1501), and an approval unit (1501).

The approval unit (1501) is configured to start a collaboration approval process by a first group for a second group.

The approval unit (1501) is configured to, when the collaboration approval process is approved, implement a cross-group collaboration by the first group with the second group such that collaboration data is shared between the first group and the second group during the cross-group collaboration.

In one embodiment, the approval unit (1501) is further configured to start the collaboration approval process for the second group when the first group initiates a collaboration project of the cross-group collaboration for the second group.

In one embodiment, the collaboration unit (1502) is further configured to: obtain verification information corresponding to the collaboration project by the first group to provide the verification information to the second group; and implement the cross-group collaboration by the first group with the second group when the second group participates in the collaboration project using the verification information.

In one embodiment, the approval unit (1501) is further configured to: start the collaboration approval process for the second group when the first group participates in a collaboration project of cross-group collaboration that is initiated by the second group.

In one embodiment, the collaboration unit (1502) is further configured to: obtain, by the first group, the verification information corresponding to the collaboration project provided by the second group; and participate in the collaboration project by the first group using the verification information to implement the cross-group collaboration with the second group.

In one embodiment, the collaboration project is created by the first group or the second group serving as an initiator; or the collaboration project is created by a cross-group collaboration platform after the first group or the second group serving as an initiator initiates a collaboration project creation request to the cross-group collaboration platform.

In one embodiment, when the second group is a preconfigured trusted group, the collaboration unit (1502) is configured to implement the cross-group collaboration by the first group with the second group without the collaboration approval process.

Figure 16:
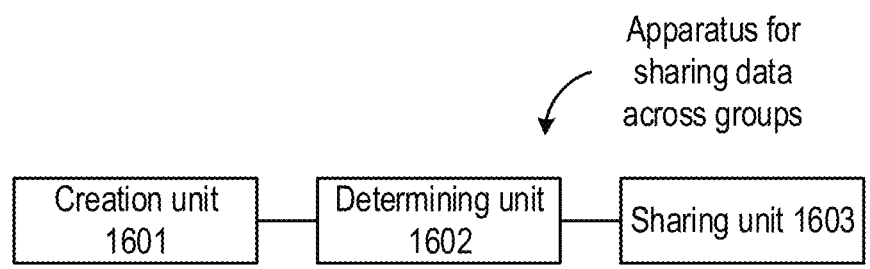
FIG. 16 is a block diagram illustrating an apparatus for sharing data across groups based on a platform according to some embodiments of the disclosure.

FIG. 16 is a block diagram illustrating a software implementation of an apparatus for sharing data across groups based on a platform, according to an embodiment of the disclosure. As shown in FIG. 16, the apparatus includes a creation unit (1601), a determining unit (1602), and a sharing unit (1603).

The creation unit (1601) is configured to create a collaboration project by a cross-group collaboration platform.

The determining unit (1602) is configured to determine groups participating in the collaboration project by the cross-group collaboration platform and to designate them as project collaborators of the collaboration project.

The sharing unit (1603) is configured to share collaboration data amongst the project collaborators of the collaboration project by the cross-group collaboration platform.

In one embodiment, the determining unit (1602) is configured to determine groups already participating in the collaboration project by the cross-group collaboration platform in at least one of the following manners.

When the collaboration project is created based on a project creation request initiated by a group, it is determined that the group participates in the collaboration project by the cross-group collaboration platform.

When a project participation invitation sent to a target group indicated by a group is acknowledged, it is determined that the target group participates in the collaboration project by the cross-group collaboration platform.

When a received project participation request sent by at least one group includes the verification information corresponding to the collaboration project, it is determined the at least one group participates in the collaboration project by the cross-group collaboration platform, where the verification information is accessible (e.g., visible) to a project collaborator of the collaboration project.

In one embodiment, the sharing unit (1603) is further configured to: share collaboration data of any project collaborator by the cross-group collaboration platform with all project collaborators in the collaboration project.

In one embodiment, the sharing unit (1603) is further configured to: obtain, by the cross-group collaboration platform, a sharing relationship configuration request initiated by any project collaborator; and share collaboration data of the project collaborator by the cross-group collaboration platform with a project collaborator specified in the sharing relationship configuration request, avoiding sharing the collaboration data of the project collaborator with other project collaborators.

In one embodiment, the sharing unit (1603) is further configured to: when some project collaborators exit the collaboration project, share collaboration data among the remaining project collaborators by the cross-group collaboration platform.

In one embodiment, the sharing unit (1603) is further configured to: store, by the cross-group collaboration platform, collaboration data generated by the project collaborators in a shared space corresponding to the collaboration project, wherein the shared space provides access permissions to the project collaborators of the collaboration project.

In one embodiment, the sharing unit (1603) is further configured to: record collaboration data generated by each project collaborator in a corresponding collaborator shared space by the cross-group collaboration platform; and implement automatic synchronization of collaboration data by the cross-group collaboration platform amongst collaborator shared spaces corresponding to the project collaborators of the collaboration project.

In one embodiment, the sharing unit (1603) is further configured to: record, by the cross-group collaboration platform, access rights assigned by at least one project collaborator to collaboration data in its own internal system, wherein the access rights become invalid when the corresponding project collaborator exits the collaboration project; and when a project collaborator initiates an access request for the collaboration data of another project collaborator, facilitate, by the cross-group collaboration platform using the recorded access rights to an internal system of the other project collaborator, the project collaborator in accessing the collaboration data in the internal system of the other project collaborator.

In one embodiment, an access scope of the access rights to the corresponding internal system includes at least one of the following: a specified access path, data of specified rights, data of a specified type, data generated in a specified time period, and data generated by employees in a specified department.

Figure 17:
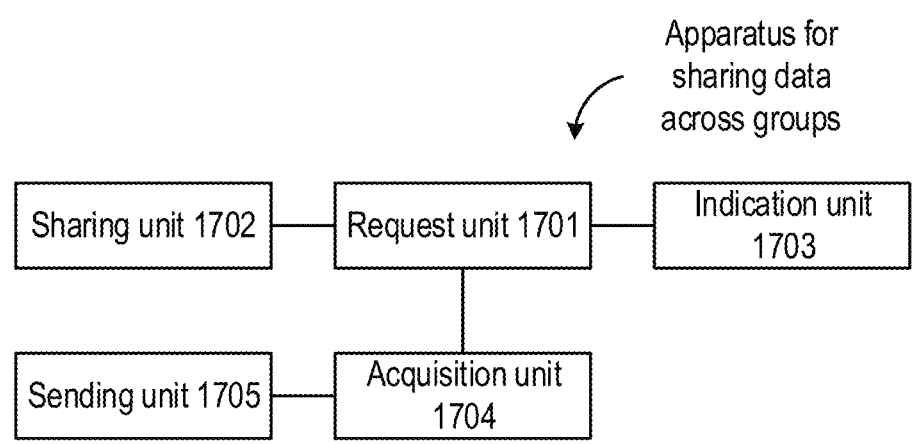
FIG. 17 is a block diagram illustrating an apparatus for sharing data across groups based on a collaboration project creator according to some embodiments of the disclosure.

FIG. 17 is a block diagram illustrating a software implementation of an apparatus for sharing data across groups based on a creator, according to an embodiment of the disclosure. The apparatus includes a request unit (1701), and a sharing unit (1702).

The request unit (1701) is configured to initiate a collaboration project creation request to a cross-group collaboration platform by a group to create a collaboration project on the cross-group collaboration platform.

The sharing unit (1702) is configured to share collaboration data by the group with at least one other group participating in the collaboration project.

a sharing unit 1702, the apparatus further includes: an indication unit (1703) configured to indicate a target group related to the collaboration project to the cross-group collaboration platform by the group such that the cross-group collaboration platform sends a project participation invitation to the target group, wherein when the project participation invitation is acknowledged by the target group, the target group is confirmed as participating in the collaboration project.

a sharing unit 1702, the apparatus further includes: an acquisition unit (1704) configured to obtain verification information corresponding to the collaboration project by the group, wherein the verification information is further recorded in the cross-group collaboration platform; and a sending unit (1705) configured to send the verification information by the group to a target group such that the target group is confirmed as participating in the collaboration project when sending a project participation request including the verification information to the cross-group collaboration platform.

a sharing unit 1702, the sending unit (1705) is further configured to: start a collaboration approval process by the group for the target group, and when the collaboration approval process for the target group is approved, send the verification information by the group to the target group; or when the target group is a pre-configured trusted group, send the verification information by the group to the target group without the collaboration approval process.

Figure 18:
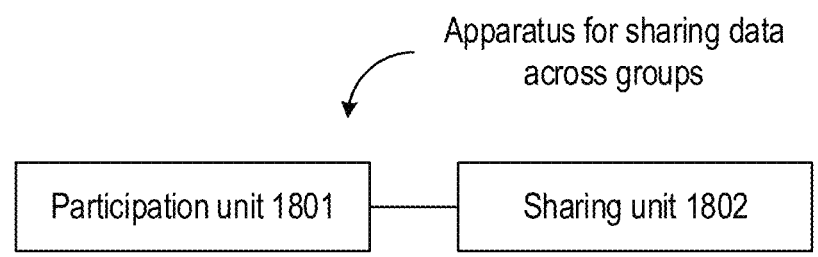
FIG. 18 is a block diagram illustrating an apparatus for sharing data across groups based on a collaboration project participant according to some embodiments of the disclosure.

FIG. 18 is a block diagram illustrating a software implementation of an apparatus for sharing data across groups based on a participant group, according to an embodiment of the disclosure. As shown in FIG. 18, the apparatus includes a participation unit (1801), and a sharing unit (1802).

The participation unit (1801) is configured to participate, by a group, in a collaboration project created on a cross-group collaboration platform.

The sharing unit (1802) is configured to share collaboration data by the group with at least one other group participating in the collaboration project.

In one embodiment, the participation unit (1801) is further configured to: receive, by the group, a project participation invitation sent by the cross-group collaboration platform; and perform an acknowledgment of the project participation invitation by the group to participate in the collaboration project.

In one embodiment, the participation unit (1801) is further configured to: obtain, by the group, verification information sent by another group already participating in the collaboration project; and send a project participation request including the verification information by the group to the cross-group collaboration platform to participate in the collaboration project when the verification information corresponds to the collaboration project.

In one embodiment, the participation unit (1801) is configured to send a project participation request including the verification information by the group to the cross-group collaboration platform in the following manner.

Starting a collaboration approval process by the group for the other group sending the verification information, and when the collaboration approval process for the other group is approved, sending a project participation request including the verification information by the group to the cross-group collaboration platform.

When the other group is a pre-configured trusted group, sending a project participation request including the verification information by the group to the cross-group collaboration platform without the collaboration approval process.

The system, apparatus, module, or unit illustrated in the afore-described embodiments may be specifically implemented by a computer chip or an entity, or a product having a certain function. A typical implementing device is a computer, and the specific form of the computer may be a personal computer, a laptop computer, a cell phone, a camera phone, a smart phone, a personal digital assistant, a media player, a navigation device, an email transmission and reception device, a game console, a tablet computer, a wearable device, or a combination of any of these devices.

In a typical configuration, the computer includes one or more processors (CPUs), input/output interfaces, network interfaces, and memories.

The memory may include a computer-readable medium in the form of a non-permanent memory, a random access memory (RAM) and/or non-volatile memory or the like, such as a read-only memory (ROM) or a flash memory (flash RAM). The memory is an example of a computer-readable medium.

The computer-readable medium includes permanent and non-permanent, movable and non-movable media that can achieve information storage by means of any methods or techniques. The information may be computer-readable instructions, data structures, modules of programs or other data. Examples of a storage medium of a computer include, but are not limited to, a phase change memory (PRAM), a static random access memory (SRAM), a dynamic random access memory (DRAM), other types of random access memories (RAMs), a read-only memory (ROM), an electrically erasable programmable read-only memory (EEPROM), a flash memory or other memory technologies, a compact disk read-only memory (CD-ROM), a digital versatile disc (DVD) or other optical storages, a cassette tape, a disk storage, a quantum memory, a graphene-based storage medium, or other magnetic storage devices, or any other non-transmission medium, and can be used to store information accessible by a computing device. According to the definitions herein, the computer-readable medium does not include transitory computer-readable media (transitory media), such as a modulated data signal and a carrier wave.

It should further be noted that the term "include," "comprise," or any other variation thereof is intended to encompass a non-exclusive inclusion, so that a process, method, commodity, or device that includes a series of elements includes not only those elements but also other elements not explicitly listed, or elements that are inherent to such a process, method, commodity, or device. The element defined by the statement "including one . . . ," without further limitation, does not preclude the presence of additional identical elements in the process, method, commodity, or device that includes the element.

The specific embodiments of the disclosure have been described above. Other embodiments fall within the scope of the appended claims. In some cases, the actions or steps recited in the claims may be performed in a different order than in the embodiments and still achieve the desired results. In addition, the processes depicted in the drawings do not necessarily require the illustrated particular order or consecutive order to achieve the desired results. In some implementations, multitask processing and parallel processing are also possible or favorable.

The terms used in one or a plurality of embodiments of the disclosure are for the purpose of describing specific embodiments only and are not intended to limit one or a plurality of embodiments of the disclosure. The singular forms "a," "said," and "the" used in one or a plurality of embodiments of the disclosure and in the appended claims are also intended to include plural forms, unless the context clearly indicates otherwise. It should also be understood that the term "and/or" used herein refers to and includes any or all possible combinations of one or a plurality of associated listed items.

It should be understood that although terms such as first, second, and third may be used to describe various types of information in one or a plurality of embodiments of the disclosure, such information should not be limited to these terms. These terms are only used to distinguish one type of information from another type of information. For example, first information may also be referred to as second information, and similarly, second information may also be referred to as first information without departing from the scope of one or a plurality of embodiments of the disclosure. Depending on the context, the word "if" as used herein may be construed to mean "when . . . " or "upon . . . " or "in response to determining."

The above descriptions are merely preferred embodiments of one or a plurality of embodiments of the disclosure and are not intended to limit one or a plurality of embodiments of the disclosure. Any modification, equivalent replacement, or improvement made without departing from the spirit and principle of one or a plurality of embodiments of the disclosure should fall within the protection scope of one or a plurality of embodiments of the disclosure.

The invention claimed is:

1. A method comprising:
   creating, by a cross-group collaboration platform, a collaboration project, the collaboration project created by a requestor and including project collaborators, the project collaborators comprising groups of users;
   sharing, by the cross-group collaboration platform, collaboration data among the project collaborators of the collaboration project, wherein sharing the collaboration data comprises:
      sharing a first set of collaboration data among all project collaborators within the collaboration project, wherein each collaborator in the project collaborators may access data in the first set of collaboration data, creating and maintaining relationship records in response to sharing relationship configuration requests, wherein each relationship record comprises an identity of an initiating project collaborator, an identity of a target project collaborator, a timestamp indicating when the relationship was created, a collaboration scope defining types of data that can be shared through the relationship, and a validity status, and sharing a second set of collaboration data according to the relationship records, wherein collaboration data specified in a relationship record's collaboration scope is shared only between the initiating and target project collaborators identified in that relationship record;

detecting, by the cross-group collaboration platform, that an exiting project collaborator has exited the collaboration project;

identifying, by the cross-group collaboration platform, data associated with the sharing relationship configuration request that was generated in a specified time period by the exiting project collaborator;

determining, by the cross-group collaboration platform, that the sharing relationship configuration request is invalid based on one or more of: the specified time period ending, the sharing relationship configuration request being unused, or the exiting project collaborator leaving the collaboration project;

removing, by the cross-group collaboration platform, access to collaboration data previously shared through identified invalid relationship records and updating their validity status.

2. The method of claim 1, further comprising:
determining, when the collaboration project is created based on a project creation request initiated by a group, the group to participate in the collaboration project;
determining, when a project participation invitation that is sent to a target group indicated by the group is acknowledged, the target group to participate in the collaboration project; and
determining, when a received project participation request sent by at least one group includes verification information corresponding to the collaboration project, the at least one group to participate in the collaboration project, the verification information being visible to a project collaborator of the collaboration project.

3. The method of claim 1, the sharing collaboration data among the project collaborators of the collaboration project comprising:
sharing collaboration data of a project collaborator with one or more other project collaborators in the collaboration project.

4. The method of claim 1, the sharing collaboration data among the project collaborators of the collaboration project comprising:
storing collaboration data generated by the project collaborators in a shared space corresponding to the collaboration project, the shared space providing access permissions to the project collaborators of the collaboration project.

5. The method of claim 1, the sharing collaboration data among the project collaborators of the collaboration project comprising:

recording collaboration data generated by each project collaborator in a corresponding collaborator shared space; and
automatically synchronizing the collaboration data among collaborator shared spaces corresponding to the project collaborators of the collaboration project.

6. The method of claim 1, the sharing collaboration data among the project collaborators of the collaboration project comprising:
recording access rights assigned by at least one project collaborator to collaboration data in an internal system of the at least one project collaborator, the access rights becoming invalid when a corresponding project collaborator exits the collaboration project; and
facilitating, when a project collaborator initiates an access request for collaboration data of another project collaborator, the project collaborator in accessing collaboration data in the internal system of the other project collaborator using the recorded access rights to an internal system of the other project collaborator.

7. A non-transitory computer-readable storage medium for tangibly storing computer program instructions capable of being executed by a computer processor, the computer program instructions defining steps of:
creating a collaboration project, the collaboration project created by a requestor and including project collaborators, the project collaborators comprising groups of users;
sharing collaboration data among the project collaborators of the collaboration project, wherein sharing the collaboration data comprises:
sharing a first set of collaboration data among all project collaborators within the collaboration project, wherein each collaborator in the project collaborators may access data in the first set of collaboration data,
creating and maintaining relationship records in response to sharing relationship configuration requests, wherein each relationship record comprises an identity of an initiating project collaborator, an identity of a target project collaborator, a timestamp indicating when the relationship was created, a collaboration scope defining types of data that can be shared through the relationship, and a validity status, and
sharing a second set of collaboration data according to the relationship records, wherein collaboration data specified in a relationship record's collaboration scope is shared only between the initiating and target project collaborators identified in that relationship record;
detecting that an exiting project collaborator has exited the collaboration project;
identifying data associated with the sharing relationship configuration request that was generated in a specified time period by the exiting project collaborator;
determining that the sharing relationship configuration request is invalid based on one or more of: the specified time period ending, the sharing relationship configuration request being unused, or the exiting project collaborator leaving the collaboration project;
removing access to collaboration data previously shared through identified invalid relationship records and updating their validity status.

8. The computer-readable storage medium of claim 7, the steps comprising one or more of:

determining, when the collaboration project is created based on a project creation request initiated by a group, the group to participate in the collaboration project;

determining, when a project participation invitation that is sent to a target group indicated by the group is acknowledged, the target group to participate in the collaboration project; and determining, when a received project participation request sent by at least one group includes verification information corresponding to the collaboration project, the at least one group to participate in the collaboration project, the verification information being visible to a project collaborator of the collaboration project.

9. The computer-readable storage medium of claim 7, the steps further comprising:

sharing collaboration data of a project collaborator with one or more other project collaborators in the collaboration project.

10. The computer-readable storage medium of claim 7, the sharing collaboration data among the project collaborators of the collaboration project comprising:

storing collaboration data generated by the project collaborators in a shared space corresponding to the collaboration project, the shared space providing access permissions to the project collaborators of the collaboration project.

11. The computer-readable storage medium of claim 7, the sharing collaboration data among the project collaborators of the collaboration project comprising:

recording collaboration data generated by each project collaborator in a corresponding collaborator shared space; and automatically synchronizing the collaboration data among collaborator shared spaces corresponding to the project collaborators of the collaboration project.

12. The computer-readable storage medium of claim 7, the sharing collaboration data among the project collaborators of the collaboration project comprising:

recording access rights assigned by at least one project collaborator to collaboration data in an internal system of the at least one project collaborator, the access rights becoming invalid when a corresponding project collaborator exits the collaboration project; and facilitating, when a project collaborator initiates an access request for collaboration data of another project collaborator, the project collaborator in accessing collaboration data in the internal system of the other project collaborator using the recorded access rights to an internal system of the other project collaborator.

13. An apparatus comprising:

a processor; and a storage medium for tangibly storing thereon program logic for execution by the processor, the stored program logic comprising:

logic, executed by the processor, for creating a collaboration project, the collaboration project created by a requestor and including project collaborators, the project collaborators comprising groups of users;

logic, executed by the processor, for sharing collaboration data among the project collaborators of the collaboration project, wherein sharing the collaboration data comprises: sharing a first set of collaboration data among all project collaborators within the collaboration project, wherein each collaborator in the project collaborators may access data in the first set of collaboration data, and creating and maintaining relationship records in response to sharing relationship configuration requests, wherein each relationship record comprises an identity of an initiating project collaborator, an identity of a target project collaborator, a timestamp indicating when the relationship was created, a collaboration scope defining types of data that can be shared through the relationship, and a validity status, and sharing a second set of collaboration data according to the relationship records, wherein collaboration data specified in a relationship record's collaboration scope is shared only between the initiating and target project collaborators identified in that relationship record;

logic, executed by the processor, for detecting that an exiting project collaborator has exited the collaboration project;

logic, executed by the processor, for identifying data associated with the sharing relationship configuration request that was generated in a specified time period by the exiting project collaborator;

logic, executed by the processor, for determining that the sharing relationship configuration request is invalid based on one or more of: the specified time period ending, the sharing relationship configuration request being unused, or the exiting project collaborator leaving the collaboration project; and logic, executed by the processor, for removing access to collaboration data previously shared through identified invalid relationship records and updating their validity status.

14. The apparatus of claim 13, the logic further comprising:

logic, executed by the processor, for determining, when the collaboration project is created based on a project creation request initiated by a group, the group as to participate in the collaboration project;

logic, executed by the processor, for determining, when a project participation invitation that is sent to a target group indicated by the group is acknowledged, the target group as to participate in the collaboration project; and logic, executed by the processor, for determining, when a received project participation request sent by at least one group includes verification information corresponding to the collaboration project, the at least one group as to participate in the collaboration project, the verification information being visible to a project collaborator of the collaboration project.

15. The apparatus of claim 13, the logic for sharing collaboration data among the project collaborators of the collaboration project comprising:

logic, executed by the processor, for sharing collaboration data of a project collaborator with one or more other project collaborators in the collaboration project.

* * * * *